(12) United States Patent
Koenekamp

(10) Patent No.: US 7,549,438 B2
(45) Date of Patent: Jun. 23, 2009

(54) VALVE HEATED BY SPLIT SOLENOID

(75) Inventor: Andreas Koenekamp, Darmstadt (DE)

(73) Assignee: GM Global Technology Operations, Inc., Detroit, MI (US)

( * ) Notice: Subject to any disclaimer, the term of this patent is extended or adjusted under 35 U.S.C. 154(b) by 231 days.

(21) Appl. No.: 11/592,941

(22) Filed: Nov. 3, 2006

(65) Prior Publication Data

US 2008/0105838 A1    May 8, 2008

(51) Int. Cl.
    *F16K 49/00*    (2006.01)
(52) U.S. Cl. .................................... 137/341; 251/129.1
(58) Field of Classification Search ................ 137/341; 251/129.09, 129.1
    See application file for complete search history.

(56) References Cited

U.S. PATENT DOCUMENTS

| | | | | |
|---|---|---|---|---|
| 5,730,091 A | * | 3/1998 | Diehl et al. ............... | 123/90.11 |
| 6,047,672 A | * | 4/2000 | Hanai et al. ............... | 123/90.11 |
| 6,167,852 B1 | * | 1/2001 | Kamimaru et al. ........ | 123/90.11 |
| 6,363,895 B1 | * | 4/2002 | Butzmann et al. ......... | 123/90.11 |
| 6,371,064 B2 | * | 4/2002 | Hartke et al. ............. | 123/90.11 |
| 6,581,556 B2 | * | 6/2003 | Kim ......................... | 123/90.11 |
| 6,946,937 B2 | * | 9/2005 | Donce ........................ | 335/282 |
| 7,204,210 B2 | * | 4/2007 | Ervin et al. ............... | 123/90.11 |
| 7,225,770 B2 | * | 6/2007 | Simpson ................... | 123/90.11 |
| 7,367,296 B2 | * | 5/2008 | Degner et al. ............. | 123/90.11 |
| 2001/0025611 A1 | * | 10/2001 | Nitkiewicz et al. ........ | 123/90.11 |
| 2003/0019948 A1 | * | 1/2003 | Shinogle et al. ............. | 239/90 |
| 2005/0188928 A1 | * | 9/2005 | Sedda et al. ............. | 123/90.11 |

* cited by examiner

*Primary Examiner*—John Fox

(57) ABSTRACT

A heated valve that has particular application for one or more of a drain valve, a pressure release valve and a bleed valve in an anode outlet unit of a fuel cell system. The valve includes a divided solenoid having at least two coils. During a normal operation of the valve, current is applied to both coils. During a heat-up operation of the valve, current is applied to only one of the coils so that the reduced resistance of a single coil provides increased heat.

22 Claims, 2 Drawing Sheets

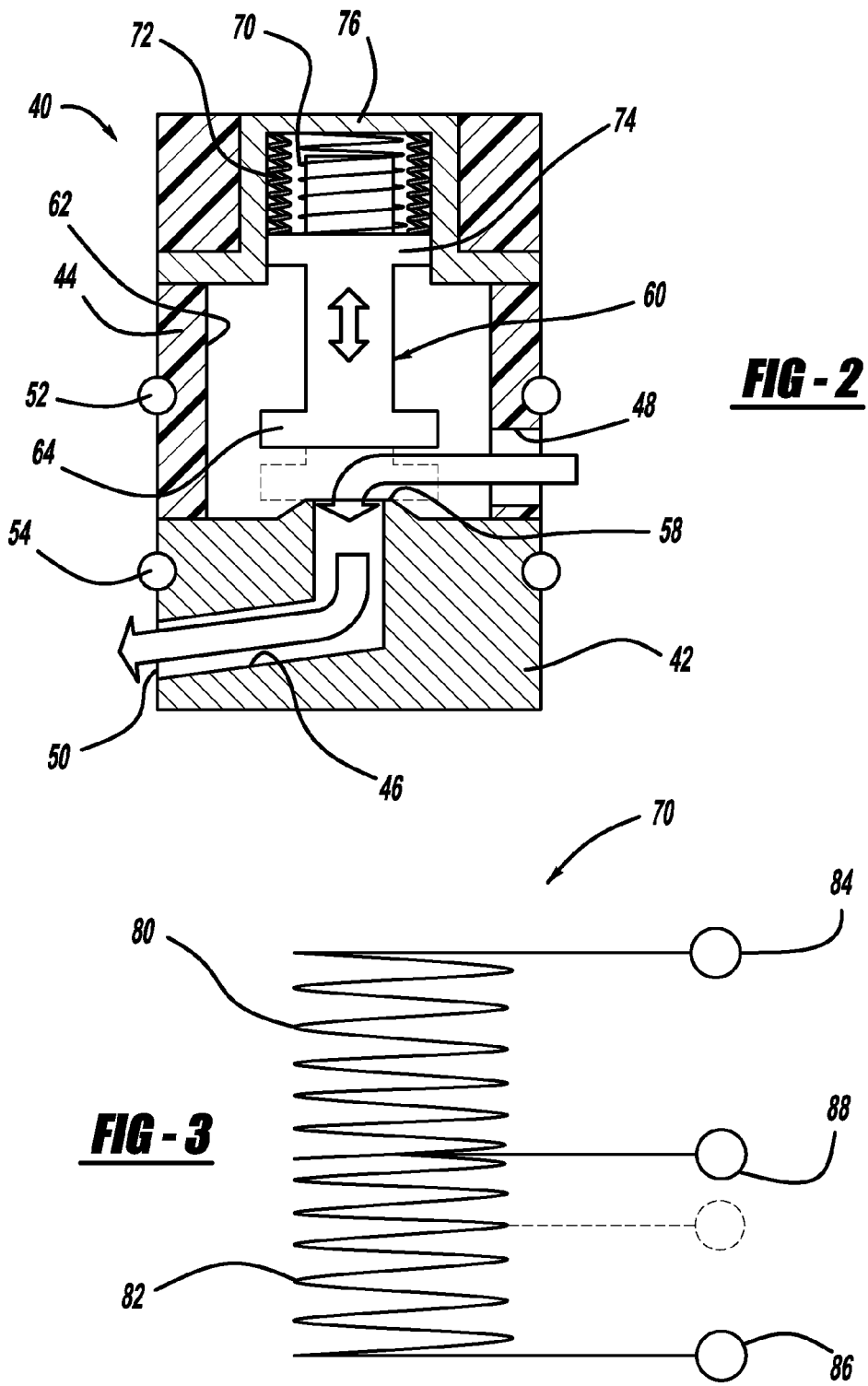

VALVE HEATED BY SPLIT SOLENOID

BACKGROUND OF THE INVENTION

1. Field of the Invention

This invention relates generally to a heated valve and, more particularly, to a heated valve that employs a divided solenoid where only one of the coils in the solenoid is energized to provide valve heating during freeze conditions, where the valve has particular application for a valve in an anode outlet unit of a fuel cell system.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen concentration such that if the nitrogen concentration increases beyond a certain percentage, such as 50%, the fuel cell stack may become unstable and may fail. It is known in the art to provide a bleed valve at the anode exhaust gas output of the fuel cell stack that is periodically opened to remove the nitrogen from the anode side of the stack.

As discussed above, it is necessary to periodically bleed the anode exhaust gas because of nitrogen accumulation in the anode side of the fuel cell stack. However, when the anode exhaust gas is bled, hydrogen is also included in the anode exhaust gas that could present a combustion problem outside of the fuel cell system. Therefore, it is known in the art to combine the anode exhaust gas with the cathode exhaust gas to reduce the concentration of exhausted hydrogen below a combustible level. Control models are known in the art to determine how much hydrogen is in the bled anode exhaust gas. Particularly, these algorithms know the pressure differential across the fuel cell stack and the flow of the gas through the bleed valve orifice, which can be used to determine the concentration of hydrogen. However, if significant water and water vapor exists in the anode exhaust gas, then the flow characteristics of the gas through the bleed valve are not able to be accurately determined. Thus, it is typically necessary to separate the water and water vapor from the anode exhaust gas before it is bled through the bleed valve.

SUMMARY OF THE INVENTION

In accordance with the teachings of the present invention, a heated valve is disclosed that has particular application for one or more of a drain valve, a pressure release valve and a bleed valve in an anode outlet unit of a fuel cell system. The valve includes a divided solenoid having at least two coils. During a normal operation of the valve, current is applied to both coils. During a heat-up operation of the valve, current is applied to only one of the coils so that the reduced resistance of a single coil provides increased heat.

Additional features of the present invention will become apparent from the following description and appended claims, taken in conjunction with the accompanying drawings.

BRIEF DESCRIPTION OF THE DRAWINGS

FIG. 2 is a cross-sectional view of the bleed valve, the drain valve or the pressure release valve, according to an embodiment of the present invention, in the system shown in FIG. 1; and FIG. 3 is a front view of a divided solenoid used in the valve shown in FIG. 2.

DETAILED DESCRIPTION OF THE EMBODIMENTS

Figure 1:
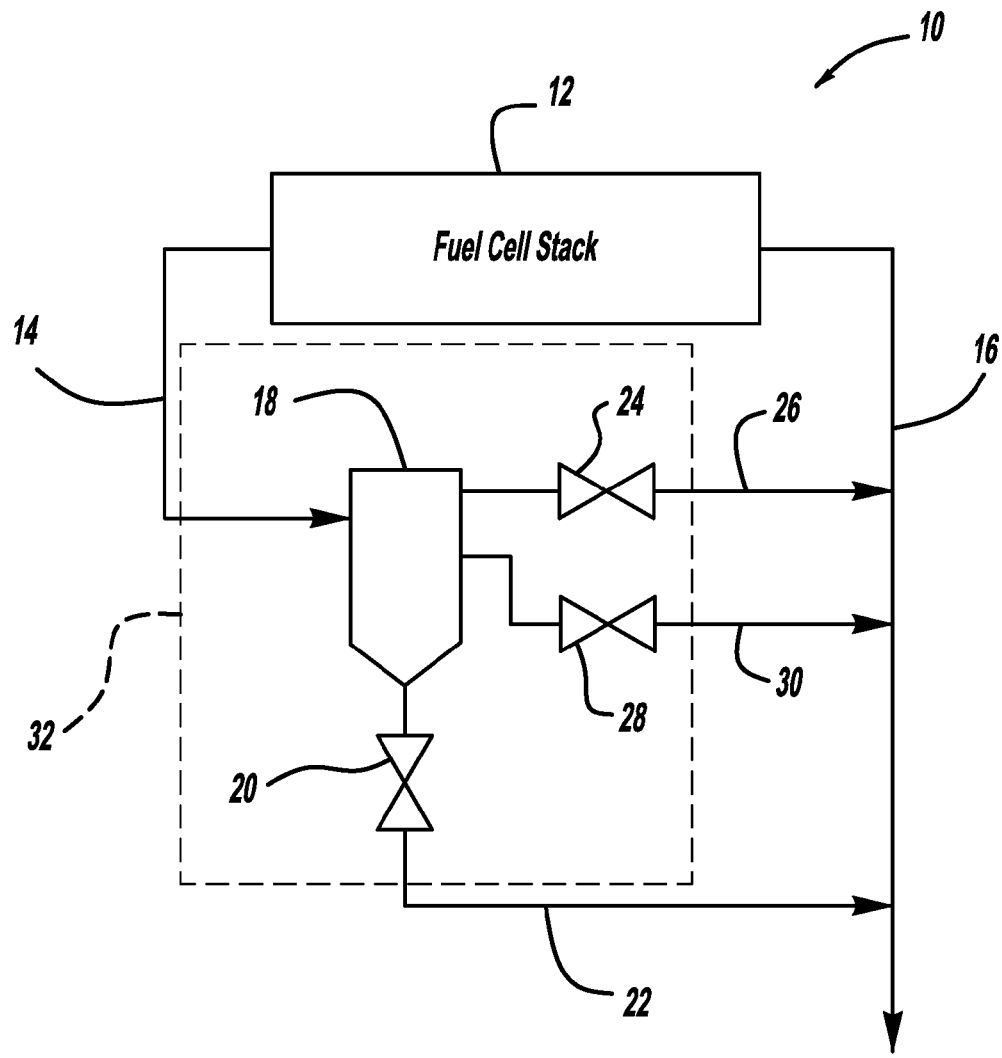
FIG. 1 is a simplified plan view of an anode outlet unit for a fuel cell system that includes a drain valve, a bleed valve and a pressure release valve.

The following discussion of the embodiments of the invention directed to a valve having a divided solenoid used for valve heating purposes is merely exemplary in nature, and is in no way intended to limit the invention or its applications or uses. For example, the valve of the present invention has particular application for one or more of a bleed valve, drain valve, or pressure release valve in an anode outlet unit of a fuel cell system. However, as is will be appreciated by those skilled in the art, the heated valve of the invention may have other uses.

In one known fuel cell system design, an anode outlet unit 32 is provided that includes several valves for controlling the flow of the anode exhaust gas from the fuel cell stack. FIG. 1 is a general plan view of part of a fuel cell system 10 including a fuel cell stack 12. An anode exhaust gas is output from the fuel cell stack 12 on an anode output line 14 and a cathode exhaust gas is output from the fuel cell stack 12 on a cathode exhaust gas line 16. As mentioned above, water is a by-product of fuel cell stack operation. Therefore, water is output from the fuel cell stack 12 through both the anode exhaust gas 14 and the cathode exhaust gas line 16.

The system 10 also includes a water separator 18 having a level indicator. The water separator 18 separates water and water vapor from the anode exhaust gas and collects it within a water trap in the water separator 18. Once the level indicator indicates that the water level in the water trap reaches a predetermined level, a drain valve 20 is opened to drain the collected water on line 22, which is mixed with the cathode exhaust gas on the line 16. The dry anode exhaust gas flowing through the water separator 18 is periodically bled on line 26 to the cathode exhaust gas line 16 through a bleed valve 24.

The anode outlet unit also includes a pressure release valve 28 that is opened to release the anode exhaust gas to the cathode output line 16 on line 30 during those times when the pressure on the cathode side of the fuel cell stack 12 goes down significantly, but the bleed valve 24 is not open because an anode exhaust gas bleed is not commanded. For example, the compressor that provides the cathode inlet air to the fuel cell stack 12 may be suddenly reduced in speed or stopped during system operation. Because the hydrogen is not being consumed on the anode side of the stack 12 during these times, there is a relatively large pressure differential between the anode side and the cathode side of the fuel cell stack 12 that could cause damage to the membrane in the fuel cells. Also, the orifice in the bleed valve 24 may not be large enough to provide pressure release.

As discussed above, some water and water vapor typically flow through the valves 20, 24 and 28. Therefore, water typically remains within the valves 20, 24 and 28 that may freeze during sub-zero conditions, preventing the valve from properly sealing during the next system startup. Therefore, it is known in the art to heat the valves 20, 24 and 28 during freeze conditions so that any water remaining in the valves 20, 24 and 28 is melted before operation of the fuel cell system. Currently, these types of valves are typically heated with uncontrolled, externally controlled or self-regulating positive temperature coefficient (PTC) ceramic heaters attached outside of the valves. However, the heater designs for these valves have a number of drawbacks. For example, the heaters typically require additional packaging space. Further, because the known heaters are relatively far away from the valve seat, it takes a relatively long period of time for the valve to heat up to the desired temperature to remove the ice during low temperature system start-up.

FIG. 2 is a broken-away cross-sectional view of an electromagnetic control valve 40 that can be used for any of the valves 20, 24 or 28 described above, according to an embodiment of the present invention. The valve 40 includes a cylindrical valve body 42, typically made of a metal, such as stainless steel, and a cylindrical valve housing 44, typically made of a suitable plastic. A flow channel 46 extends through the valve body 42 and the valve housing 44. An inlet opening 48 is provided in the valve housing 44 for receiving the fluid and an outlet opening 50 is provided in the valve body 42 through which the fluid exits the valve 40. O-rings 52 and 54 seal the flow channels outside of the valve 40. The valve body 42 includes an annular valve seat 58. A valve tappet 60 moves up and down within a chamber 62 in the valve housing 44, and includes a seal portion 64 that seats against the valve seat 58 when the valve 40 is in the closed position.

According to the invention, the valve 40 includes a divided electromagnetic solenoid 70, described in detail below, that is activated to lift the valve tappet 60 to open the flow channel 46 in a manner that is well understood in the art. The valve 40 is a normally closed valve in that the seal portion 64 seats against the valve seat 58 by springs 72 when the solenoid 70 is not energized. For example, the springs 72 are positioned between an annular rim 74 of the tappet 60 and a magnetic piece 76 so that the seal portion 64 is forced against the valve seat 58 when the valve 40 is not energized. In alternate embodiments, the valve 40 can be a normally open valve where the springs 72 would be reconfigured, as would be well understood to those skilled in the art, and the solenoid 70 would be energized to push the seal portion 64 against the valve seat 58.

FIG. 3 is a side view of the divided solenoid 70 removed from the valve 40. The divided solenoid 70 includes an upper coil 80 and a lower coil 82. A terminal 84 is electrically coupled to one end of the upper coil 80 and a terminal 86 is electrically coupled to an opposite end of the lower coil 82. A terminal 88 is electrically coupled to common connected ends of the upper coil 80 and the lower coil 82.

During normal operation of the valve 40, the terminal 88 is open circuited and a supply voltage is applied to the terminals 84 and 86 to energize the coils 80 and 82 and operate the valve 40. In a valve heat-up operation during a freeze condition, the terminal 84 is open circuited, and the supply voltage is only applied to the lower coil 82 across the terminals 86 and 88. For the same supply voltage and half the resistance provided by half the length of solenoid 70, the current is doubled, which provides twice the amount of heat. Thus, more heat is provided to the tappet 60 and the valve seat 58 to melt the ice that may be in the valve 40 more quickly.

In this embodiment, the terminal 88 is shown mid-way between the terminals 84 and 86 where the length of the coils 80 and 82 is the same. However, in alternative embodiments, it may be desirable to shorten or lengthen the lower coil 82 to provide less or more heating. In one embodiment, as shown in phantom, the lower coil 82 is shorter than the upper coil 80 to provide even more heating for the same power solenoid. Also, more than two coils can be provided in the solenoid 70, where more terminals would be provided to operate the combination of coils at different levels of heating in the same manner as discussed herein.

There may be a desire to provide heating by the solenoid 70 as discussed above without having the solenoid 70 move the tappet 60. Therefore, according to another embodiment of the invention, a supply voltage is applied to the terminal 88 and the terminals 84 and 86 are grounded. Alternately, the supply voltage can be applied to the terminals 84 and 86 and the terminal 88 can be grounded. In either of these electrical configurations, the current propagating through the upper coil 80 and the lower coil 82 are equal, but in opposite directions. The forces induced by the currents neutralize each other and the tappet 60 does not move. As compared to the normal operation mode, the current propagating through each coil 80 and 82 is doubled, which provides a total increase in heating power of four.

The valve 40 needs to be designed so that the heat generated by the solenoid 70 is able to reach the valve seat 58. Therefore, the valve tappet 60 can be made of a thermally conductive material, such as stainless steel, the valve housing 44 can be made of a thermal conductive material, or both can be made of a thermally conductive material.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A valve comprising:
   a valve body including a valve seat;
   a valve tappet having a seal end positioned proximate to the valve seat and being operable to be moved to open and close the valve; and
   a divided solenoid including a first coil and a second coil, said solenoid being energized to move the valve tappet, said divided solenoid including a first terminal coupled to one end of the first coil, a second terminal coupled to one end of the second coil and a third terminal coupled to both of the other ends of the first and second coils where the other ends of the first and second coils are coupled together, said solenoid being operated in a normal mode where a supply voltage is provided to the first and second terminals and the third terminal is open-circuited to energize the solenoid and move the tappet, and in a first heating mode where the supply voltage is applied to the second and third terminals and the first terminal is open-circuited to energize the solenoid and move the tappet and generate more heat than the normal mode that heats the valve seat.

2. The valve according to claim 1 wherein the first and second coils are approximately the same length so that the third terminal is halfway between the first and second terminals.

3. The valve according to claim 1 wherein the first and second coils are different lengths.

4. The valve according to claim 3 wherein the second coil is shorter in length than the first coil.

5. The valve according to claim 1 wherein the second coil is closer to the seal end of the valve tappet than the first coil.

6. The valve according to claim 1 further comprising a valve housing mounted to the valve body, said valve tappet being positioned within the valve housing, said valve housing being made of a thermally conductive material.

7. The valve according to claim 1 wherein the valve tappet is made of a thermally conductive material.

8. The valve according to claim 1 further comprising a spring, said valve being a normally closed valve where the spring positions the seal end of the target against the valve seat when the solenoid is not energized.

9. The valve according to claim 1 wherein the solenoid is operated in a second heating mode where the supply voltage is applied to the third terminal and the first and second terminals are grounded so as to generate heat that heats the valve seat without moving the tappet.

10. The valve according to claim 1 wherein the solenoid is operated in a second heating mode where the supply voltage is applied to the first and second terminals and the third terminal is grounded so as to generate heat that heats the valve seat without moving the solenoid.

11. The valve according to claim 1 wherein the valve is pad of an anode outlet unit in a fuel cell system.

12. The valve according to claim 11 wherein the valve is selected from the group consisting of anode exhaust gas bleed valves, anode exhaust gas pressure release valves and anode exhaust gas drain valves.

13. A valve for an anode outlet unit of a fuel cell system, said valve comprising:
   a valve housing including a valve housing chamber;
   a valve tappet positioned within the valve housing chamber and having a seal end;
   a valve body including a valve seat having an opening therethrough so that the valve housing chamber and a flow channel in the valve body are in fluid communication with each other, wherein the seal end of the valve tappet seats against the valve seat to close the flow channel;
   a spring positioned within the valve housing chamber and being operable to maintain the valve in a normally open or a normally closed position; and
   a divided solenoid having a first coil and a second coil, said solenoid being energized to move the valve tappet, said divided solenoid including a first terminal coupled to one end of the first coil, a second terminal coupled to one end of the second coil and a third terminal coupled to both of the other ends of the first and second coils where the other ends of the first and second coils are coupled together, said divided solenoid being operated in a normal mode where a supply voltage is provided to the first and second terminals and the third terminal is open-circuited to energize the solenoid and move the tappet, and in a first heating mode where the supply voltage is applied to the second and third terminals and the first terminal is open-circuited to energize the solenoid and move the tappet and generate more heat than the normal mode that heats the valve seat, wherein one or both of the valve housing or the valve tappet is made of a thermally conductive material.

14. The valve according to claim 13 wherein the first and second coils are approximately the same length so that the third terminal is halfway between the first and second terminals.

15. The valve according to claim 13 wherein the first and second coils are different lengths.

16. The valve according to claim 15 wherein the second coil is shorter in length than the first coil.

17. The valve according to claim 13 wherein the second coil is closer to the seal end of the valve tappet than the first coil.

18. The valve according to claim 13 wherein the solenoid is operated in a second heating mode where the supply voltage is applied to the third terminal and the first and second terminals are grounded so as to generate heat that heats the valve seat without moving the tappet.

19. The valve according to claim 13 wherein the solenoid is operated in a second heating mode where the supply voltage is applied to the first and second terminals and the third terminal is grounded so as to generate heat that heats the valve seat without moving the solenoid.

20. A valve comprising a divided solenoid having a first coil and a second coil, said divided solenoid including a first terminal coupled to one end of the first coil, a second terminal coupled to one end of the second coil and a third terminal coupled to both of the other ends of the first and second coils where the other ends of the first and second coils are coupled together, said solenoid being operated in a normal mode where a supply voltage is provided to the first and second terminals and the third terminal is open-circuited to energize the solenoid and move the tappet, and in a first heating mode where the supply voltage is applied to the second and third terminals and the first terminal is open-circuited to energize the solenoid and move the tappet and generate more heat than the normal mode.

21. The valve according to claim 20 wherein the solenoid is operated in a second heating mode where the supply voltage is applied to the third terminal and the first and second terminals are grounded so as to generate heat that heats the valve seat without moving the tappet.

22. The valve according to claim 20 wherein the solenoid is operated in a second heating mode where the supply voltage is applied to the first and second terminals and the third terminal is grounded so as to generate heat that heats the valve seat without moving the solenoid.

* * * * *